F. A. STEVENS.
MOUNTING.
APPLICATION FILED NOV. 2, 1917.
1,274,808.
Patented Aug. 6, 1918.
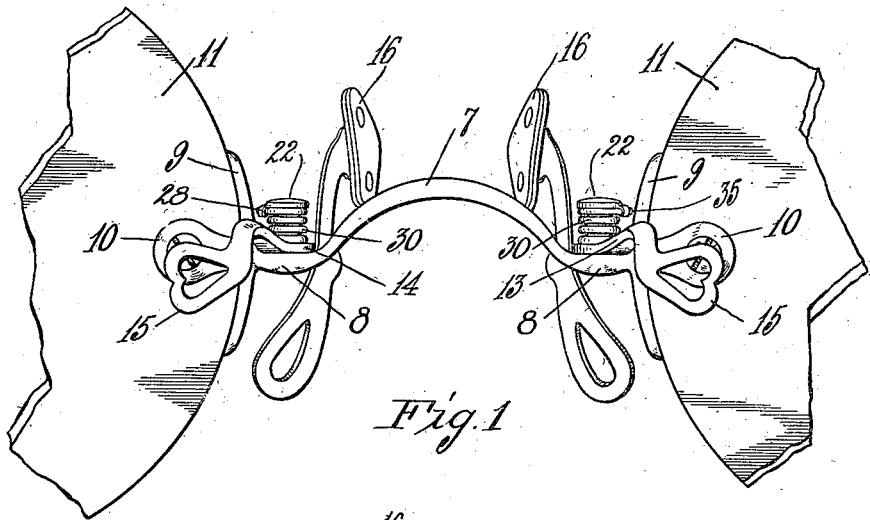
Fig. 1.
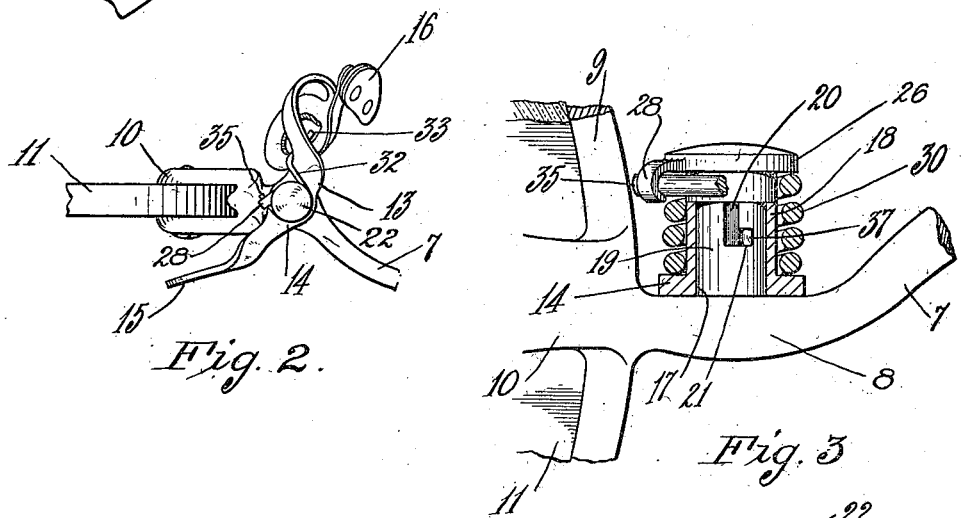
Fig. 2.
Fig. 3.
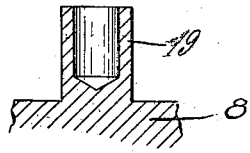
Fig. 4.
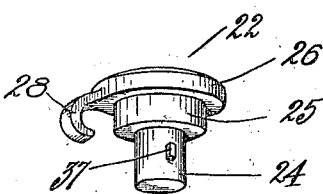
Fig. 5.
Inventor:
Frederick A. Stevens,
By Horatio E. Bellows,
Attorney.

UNITED STATES PATENT OFFICE.

FREDERICK A. STEVENS, OF PROVIDENCE, RHODE ISLAND, ASSIGNOR TO STEVENS AND COMPANY, INCORPORATED, A CORPORATION OF RHODE ISLAND.

MOUNTING.

1,274,808.  Specification of Letters Patent.  Patented Aug. 6, 1918.

Application filed November 2, 1917. Serial No. 199,804.

*To all whom it may concern:*

Be it known that I, FREDERICK A. STEVENS, a citizen of the United States, residing at Providence, in the county of Providence and State of Rhode Island, have invented certain new and useful Improvements in Mountings, of which the following is a specification.

My invention relates to mountings of the finger piece type.

The essential objects of my invention are to avoid the use of screws or threaded members in the pivot post, and to provide a bearing means for the actuating spring ends other than the mounting frame itself or some part thereof such as a lens strap. When the pivot posts with their surrounding springs are required, for any reason to be located in any position outside the plane of the lenses special posts have heretofore been required to serve as bearings for the spring ends; and it is sought to avoid this requirement.

Another object is to utilize the energy of the spring itself to maintain the bearing member itself in locked position.

Other objects are facility of assemblage of parts and inexpensiveness of manufacture.

To the above ends my invention consists in such parts and combinations of parts as fall within the scope of the appended claims.

In the accompanying drawings which form a part of this specification,

Figure 1 is a front elevation of a pair of eyeglasses or spectacles,

Fig. 2, a plan of a portion of the same,

Fig. 3, an enlarged central vertical section, partly in side elevation, of one of the pivot members and adjacent parts, Fig. 4, a vertical section of a post, and Fig. 5, a detail view of a locking member.

Like reference characters indicate like parts throughout the views.

In the drawings 7 represents the bridge of a pair of eyeglasses or spectacles provided with the usual flattened end portions or platforms 8 carrying the straps 9 and the attaching lugs 10 for the lenses 11. The levers or operating arms 13 in this instance comprise in each case a flat intermediate portion 14 and thumb piece 15 upon its forward end and a nose bearing pad 16 upon the rear end. The intermediate portion of each lever has an opening 17 to admit the pivot member continuous with which in this instance is a bearing sleeve 18.

Upon each platform 8 and preferably integral therewith is a tubular post 19 provided with an L shaped or bayonet slot comprising a vertical portion 20 extending downwardly from the upper edge of the post, and a horizontal portion 21 extending from the lower end of the portion 20.

A pin 22 shown in detail in Fig. 5 comprises a cylindrical body or finger 24 slidable in the post 18, also an annular cylindrical shoulder 25 whose diameter is the same as the exterior diameter of the sleeve 18. This shoulder rests upon the top of the tubular post. The pin is completed by a head 26 of greater diameter than the shoulder and has projecting from its edge or periphery a hook or finger 28.

The helical operating springs each comprise a series of coils 30 surrounding the sleeve 18 and having its lowermost coil resting upon the operating arm 13 while the uppermost coil abuts against the head 26. The lowermost coil is extended to form an arm 32 whose end 33 is bent to engage the lever 13. The upper coil has its end extended to form a short arm 35, which arm rests in the finger or hook 28.

In assembling the parts each arm 13 is positioned upon a post and the spring 30 is next applied. The member 22 is next inserted by bringing the lug or projection 37 which is located upon the side of the shank 24, into alinement with portion 20 of the bayonet slot down along which the projection travels until the shoulder 25 contacts with the top of the post whereupon the projection is adapted to enter the horizontal portion 21 of the post. The projection is induced to remain securely in the last described position by engaging the arm 35 with the finger 28. Thus the pressure of the spring arm 35 operates through the lever and the pin to the desired end. The arm 33 of the spring it will be understood is brought into engagement with the lever arm. After the described assemblage of the parts it will be noted that the member 22 is locked against accidental vertical movement and consequent escape. The spring is insured against accidental escape and the parts are easily disassembled when desired by manually reversing the described operation.

The operation of the lever arms will be readily understood from the fact that the springs normally press the pads 16 toward each other against the nose and when it is desired to remove the device the thumb pieces 15 are pressed toward each other by the thumb and finger.

In the illustration of my invention as shown it happens that the posts 19 are in the plane of the lenses but my described construction is such that the parts operate with equal efficiency regardless of the position of the posts relatively to the lenses, whether in front or behind the same. It is unnecessary by reason of the above construction that the arm 35 be extended to engage any part of the frame nor is it necessary that any auxiliary post be erected upon the frame to form a stop or bearing for the spring arm 35.

I claim:—

1. In a device of the character described, the combination with a support, of a post on the support, a lever having a sleeve surrounding the post, and a spring surrounding the sleeve having one end carried by the post and the other end engaging the lever.

2. In a device of the character described, the combination with a support, of a tubular post on the support, a lever having a sleeve surrounding the post, a helical spring surrounding the sleeve having one end engaging the lever, and a member detachably mounted in the post overhanging the spring and engaged by the other end of the spring.

3. In a device of the character described, the combination with a support and a swinging lever, of a tubular post on the support provided with a slot and upon which the lever is mounted to swing, an oscillatory pin journaled in the post, a lug on the pin registering in the slot, and a spring for actuating the pin surrounding the post and engaging the lever.

4. In a device of the character described, the combination with a support and a swinging lever, of a tubular post on the support provided with an angular slot and upon which the lever is mounted to swing, an axially movable pin journaled in the post, a lug on the pin registering in the slot, and a spring for moving the pin surrounding the post and engaging the lever.

5. In a device of the character described, the combination with the support and a swinging lever, of a post on the support and upon which the lever is mounted to swing, a pin journaled in the post, a head upon the pin, an extension on the head, and a spring surrounding the post having one end engaging the extension and the other end engaging the lever.

6. In a device of the character described, the combination with the support and a swinging lever, of a tubular post on the support provided with a slot and upon which the lever is mounted to swing, a pin journaled in the post, a lug on the pin registering in the slot, a head upon the pin, a hook shaped extension upon the head, and a spring surrounding the post having one end seated in the extension and the other end engaging the lever.

7. In a device of the character described, the combination with the support and a swinging lever, of a tubular post on the support provided with a bayonet slot and upon which the lever is mounted, a pin loose in the post, a lug on the pin registering in the slot, a shoulder on the pin abutting against the post, a head on the pin, an extension on the head, a helical spring surrounding the post and engaging the extension and lever.

8. In a device of the character described, the combination with a support, of a post on the support, a lever resting on the support, a sleeve on the lever loose on the post, an oscillatory pin in the post, and a helical spring for actuating the pin embracing the sleeve and engaging the lever.

In testimony whereof I have affixed my signature.

FREDERICK A. STEVENS.

Copies of this patent may be obtained for five cents each, by addressing the "Commissioner of Patents, Washington, D. C."